United States Patent [19]

Wedlake

[11] Patent Number: 4,707,420

[45] Date of Patent: Nov. 17, 1987

[54] POWER STORAGE BATTERY

[75] Inventor: Roger J. Wedlake, Johannesburg, South Africa

[73] Assignee: South African Inventions Development Corporation, Pretoria, South Africa

[21] Appl. No.: 862,209

[22] Filed: May 8, 1986

Related U.S. Application Data

[63] Continuation of Ser. No. 750,979, Jul. 1, 1985, abandoned, which is a continuation of Ser. No. 588,240, Mar. 12, 1984, abandoned.

[30] Foreign Application Priority Data

Mar. 16, 1983 [ZA] South Africa ............. 83/1837

[51] Int. Cl.$^4$ .............. H01M 6/36; H01M 10/50
[52] U.S. Cl. ........................... 429/11; 429/120; 429/158; 429/159; 320/16
[58] Field of Search ............. 429/11, 18, 120, 158, 429/159, 123; 320/16, 17

[56] References Cited

U.S. PATENT DOCUMENTS

| | | | |
|---|---|---|---|
| 2,014,832 | 9/1935 | Burgess | 429/158 |
| 2,151,193 | 3/1939 | Deibel | 429/159 |
| 2,185,829 | 1/1940 | Burgess | 429/159 |
| 3,887,396 | 6/1975 | Walsh et al. | 429/128 |
| 4,287,267 | 9/1981 | Whittlesey et al. | 429/158 |
| 4,371,825 | 2/1983 | Chi et al. | 429/123 |

OTHER PUBLICATIONS

Ford Aerospace Communications Corp., Aeronutronic Div., "Sodium-Sulfur Battery Development Economic Analysis".
Reference Design of 100 MW-h Lithium/Iron Sulfide Battery System for Utility Load Leveling.

Primary Examiner—Brian E. Hearn
Assistant Examiner—Stephen J. Kalafut
Attorney, Agent, or Firm—Arnold, White & Durkee

[57] ABSTRACT

The invention provides a power storage battery (10) comprising a multiplicity of interconnected identical electrochemical power storage cells (11) whose internal resistance varies with their temperature. The cells are interconnected into a plurality of groups (16, 18, 31) with each group comprising a plurality of the cells, at least some of which are connected in series. The groups are connected in parallel and the battery in use has a temperature profile whereby at least some of its cells are at different temperatures from one another. The cells of each group are located and interconnected so that, in use, each group has substantially the same internal resistance as any other group.

19 Claims, 35 Drawing Figures

POWER STORAGE BATTERY

This application is a continuation, of application Ser. No. 750,979, filed July 1, 1985, which is a continuation of Ser. No. 588,240, filed Mar. 12, 1984 both abandoned.

This invention relates to a power storage battery. In particular it relates to a power storage battery comprising a multiplicity of electrochemical power storage cells whose internal resistance varies with temperature, the cells being interconnected in a plurality of groups each comprising a plurality of cells and the groups being connected in parallel to form the battery.

While the invention can have utility with a multiplicity of as few as ten cells forming the battery, it is contemplated that batteries in accordance with the invention will generally have at least twenty cells. Two significant applications of the invention will be in electric vehicle propulsion, where batteries of 50–200 cells will typically be encountered; and load levelling for power stations, where batteries comprising tens of thousands, or more, cells are a possibility.

In the practical handling of a battery comprising a multiplicity of ten or more cells, the cells are typically arranged in more or less regular arrays for ease of service, maintenance, replacement etc, and to provide for efficient housing and insulation thereof. In such arrays, and particularly with the large arrays of cells expected for motor vehicle propulsion or power station load levelling, thermal management of the cells can become a significant problem. For reasons of access for repair, replacement, inspection etc, large numbers of cells will frequently be arranged in substantially two dimensional arrays, ie layers of cells not usually more than two cells thick at the most, and generally in a layer one cell thick, a layer comprising a multiplicity of cells in a side by side arrangement.

Furthermore, the problem of thermal management is aggravated when high temperature cells are employed, eg sodium sulphur cells or cells employing beta-alumina or Nasicon solid electrolytes, or molten salt liquid electrolytes, either alone or in combination. In two dimensional arrays, even when the periphery of the array is efficiently thermally insulated, cells at the periphery of the array can have a significantly lower temperature then cells near the centre of the array, when the array is in use.

In addition, for reasons of mass production, standardization and interchangeability of components, large arrays of cells will typically employ cells which are identical, at least nominally, in that they will be manufactured according to identical specifications (size, shape, the nature of their components, etc).

In batteries comprising such arrays, randomly interconnecting cells together form groups (the groups being connected in series, in parallel or in series/parallel) whose composition is chosen for reasons unrelated to the thermal management of the cell, can lead to severe and unexpected problems in use. Thus, for example, if one group of cells comprises hotter cells (eg at or near the centre of the array) than another nominally identical group (at or near the periphery of the array) connected in parallel thereto, the group of hotter cells can have a substantially different overall internal resistance from that of the group of cooler cells. This can lead to internal circulating currents, ie internal current loops in the battery, which are highly undesirable.

Furthermore, as cooler high temperature cells tend to have a higher internal resistance than hotter nominally identical cells, a group of hotter cells will in use have a larger current flowing therethrough than a group of cooler cells connected in parallel thereto. Resistance heating of the cooler cells will not be promoted, and the undesirable temperature difference between the cooler and hotter groups of cells will tend to be maintained or even aggravated. This can be a serious problem when high temperature cells having a relatively narrow temperature range for optimum operation, are used in large arrays. In this case, although the battery will have an intended operating temperature, ie a temperature within said optimum range, the situation can even arise where hotter groups in use can require eternal cooling while, simultaneously, cooler groups require external heating, to maintain them within their optimum operating temperature range.

The present invention seeks to provide a battery in which the aforegoing problems of temperature management are at least reduced.

Accordingly, the invention provides a power storage battery which comprises a multiplicity of interconnected nominally identical electrochemical power storage cells whose internal resistance varies with their temperature, the cells being interconnected into a plurality of groups with each groups comprising a plurality of the cells at least some of which are connected in series and the groups being connected in parallel, the battery in use having a temperature profile whereby at least some of its cells are at different temperatures from one another, and the cells of each group being located and interconnected so that, in use each group has substantially the same internal resistance as each other group.

In other words, the battery as a whole will comprise a multiplicity of cells interconnected in series/parallel, two or more groups of cells, each comprising a plurality of the cells, being connected in parallel, and at least some of the cells of each group being connected in series. The cells of each group may in turn be connected in series, or may be connected in series/parallel. When the cells of each group are connected in series/parallel, the group can be regarded as a sub-battery, and the invention is thus equally applicable thereto, so that the cells of the series/parallel group can be arranged and connected in a similar fashion to the cells of the battery as a whole.

In accordance with the invention it is important that, as far as possible (subject to the physical constraints of the shape of the battery, its intended operating temperaure, its temperature profile, the number of groups and the number of cells in each group, etc.) the individual cells and their interconnections should be arranged so that each group in operation at the intended operating temperature of the battery, has the same internal resistance.

Owing to the temperature profile of the battery, the battery will have various cells at different temperatures, when the battery is at its intended operating temperature. For reasons of manufacture, replaceability, maintenance and standardization, it is convenient that each group of cells should have, at least roughly, the same number of cells as each of the other groups. For each group to have substantially the same internal resistance at the intended operating temperature of the battery, each group of cells preferably has the same number of cells as any other group, at least some of the cells in each group accordingly, in use, having different temperatures. In a particularly preferred form of the invention, each group preferably has the same number of cells at a particular temperature in use, as any other group.

An exact one for one equivalence, whereby each group has exactly the same number of cells at any particular temperature as any other group, although convenient an facilitating battery design, is however not essential, provided that this situation is sufficiently approximated over each group for all the groups each to have substantially the same internal resistance.

Once again, for reasons of geometrical similarity between the groups and standardization, it is preferable that, in each of the groups, each cell having a particular temperature in use, is at the same position in the series making up the group in which it is contained. Likewise, it is not strictly necessary for cells of various temperatures to be interconnected in exactly the same order so that each group has the same or an extremely similar temperature profile along its series of cells from one end of the group to the other, but once again, this arrangement also facilitates battery design.

Thus in a particularly preferred embodiment, each group has exactly the same number of cells at a particular temperature as any other group, and in each group a cell at a particular temperature in use is at the same position along the series of the group, as in any other group. In practice, this can be effected by arranging the cells in the battery so that they can be divided easily into thermally equivalent groups, eg by one or more flat geometrical planes, each group having the same number of cells and the cells of each group being connected so that cells in thermally equivalent positions are connected in series in the groups of which they form part, with each cell at the same position in its series as the thermally equivalent cell in each of the other groups. If each of the thermally equivalent groups is of substantially the same geometry as the others, cells in geometrically equivalent positions in the various groups will generally be in thermally equivalent positions as well.

According to the invention further, to facilitate battery design and the selection of cell positions and their interconnection in the battery, for easy replacement, maintenance, standardization and the like, the cells of the battery may be arranged in a substantially two dimensional array, the array comprising a layer of cells typically not more than two cells thick. The array may be flat and may have an outline whereby it can be divided into the aforesaid groups by at least one flat geometrical plane perpendicular to the array, each group having substantially the same geometrical arrangement of cells as any other group and cells which have substantially the same temperature in use occupying substantially the same geometrical positions in each group.

When the array is substantially two dimensional, the packing arrangement of the cells may be such that the cells are arranged in a geometrically regular close-packed array. Cells of the type in question are conveniently, and in practice frequently are, elongated and cylindrical or prismatic in cross-section. For such cells, the invention contemplates a close-packed, side-by-side, packing arrangement of the cells in one or more two-dimensional arrays or layers in the battery. This packing may be cubic close-packing for cells of square or rectangular cross-section, or, for cells of circular, hexagonal or equilateral-triangular cross-section, hexagonal close-packing may be preferred.

For any particular packing arrangement or array, eg one which is hexagonal close-packed or cubic close-packed, battery design can be simplified as regards definition of the groups and as regards interconnection of the cells in the groups, if the outline of the array, when viewed in a direction perpendicular to the array (ie not from one side or edge thereof) is a regular polyhedron, an equilateral triangle being one limiting case, and a circle being the other. Accordingly, for close-packing, the cells themselves may be regular polyhedra in outline, when viewed in a direction perpendicular to the array.

In such cases, the battery can easily be divided into a number of zones (one for each group of cells and the number of zones being the same as or proportional to the number of sides of the polyhedral outline of the array) by the equivalent number of flat planes perpendicular to the array (ie parallel to the central axis of the polyhedral outline of the array) said flat planes radiating in a circumferentially equally spaced arrangement from the central axis of the array, to divide the array in plan view into a plurality of identical segments, the cells of each group thus being located in one of the segments.

Such an arrangement provides for easy interconnection of cells in a group according to the invention, starting, say, at the cell nearest the central axis and progressing radially outwardly, eg in zig-zag fashion, to the periphery of the array.

Preferably each cell is connected to an immediately adjacent cell, ie an immediate neighbour. Starting at the central axis and progressing radially outwardly facilitates connecting each cell to an immediate neighbour, and interconnection of the cells can be done according to a simple geometrically dictated sequence, greatly facilitating meeting the requirement of the invention that each group of cells should have the same number of cells at the same temperature. In this regard it should be borne in mind that in a regular polyhedral cell layout in an array, the central cells will typically be the hottest and the cell temperature will typically drop progressively in a direction from the centre of the array radially outwardly, with all cells at the same radial distance from the central axis of the array being at least roughly at the same temperature, provided that the periphery of the array is uniformly insulated.

The invention will now be described, by way of example, with reference to the accompanying schematic drawings, which show diametrically various battery layouts according to the invention, and in which.

Figure 1A:
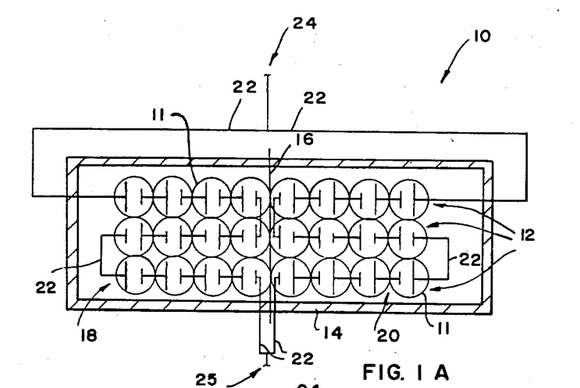
FIG. 1A shows a schematic plan view of a simplified battery cell array in accordance with the invention, with FIG. 1B showing a circuit diagram thereof.

In FIG. 1 of the drawings, there if shown a battery 10 with an array of identical cylindrical cells 11 arranged in a cubic close-packed arrangement, the battery having an elongated rectangular outline. The cells are arranged in three rows 12 of eight cells each, enclosed in an insulating housing 14. The array of cells shown in FIG. 1 is in the form of a flat layer of cells, one cell thick, i.e. no cells are packed or arranged on top of one another in a superimposed or stacked relationship. The cells are divided into two groups of twelve cells each by a plane 16 intersecting the long sides of the battery at their mid-points. The plane 16 divides the cells 11 into two groups 18 and 20, each group 18,20 being connected in series as shown by leads 22, the leads 22 leading from one battery terminal 24 to the other at 25. In other words, the cells of each group 18,20 are connected in series, and the group 18 is connected in parallel with the group 20.

On the basis that the battery 10 has a temperature porfile whereby the temperature is at a maximum at the mid- point of the central row 12 of cells 11, the temperature decreasing therefrom towards the periphery of the battery defined by the housing 14, it will be noted that the interconnectons between the various cells 11 are such that each group 18,20 contains the same number of cells 11, and each cell in each group has a corresponding cell in the other group at a geometrically and thermally equivalent position, each thermally equivalent cell being connected at the same position along the series of cells making up that group. The internal resistance of these themally equivalent cells should be substantially the same, so that each group 18,20 should have substantially the same overall internal resistance.

Although the precise order in which the cells of each group are connected is not critical, it will be notd that each cell is wired to its nearest neighbour cell, thus reducing the length of wiring used. It should also be noted that as each cell in use will have the same current passing therethrough, the outer cooler cells will have a higher internal resistance and will be heated more, and this will tend to reduce any temperature gradient between cells in a group, and will tend to flatten the temperature profile of the battery as a whole.

Figure 1B:
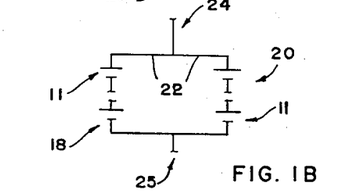

FIG. 1B shows a circuit diagram of the cell of FIG. 1A, and the same reference numerals are used to designate the same parts as in FIG. 1A.

Figure 2A:
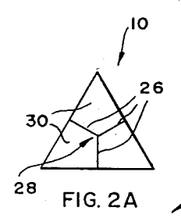
FIGS. 2A to 2H show the outlines in plan view of various possible cell arrays in accordance with the invention and how they can be divided into zones to contain thermally equivalent groups of cells.
Figure 2B:
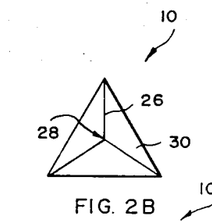

With reference to FIG. 2, FIGS. 2A and 2B show batteries having cell arrays with plan view outlines in the form of equilateral triangles; FIGS. 2C and 2D show outlines which are square; FIGS. 2E and 2F show batteries with outlines which are regular pentahedra; and FIGS. 2F and 2H show batteries with outlines which are regular hexahedra.

In FIG. 2A, the outline of the battery is shown divided into three zones by intersecting radial planes 26 radiating in equally circumferentially spaced relationship from the central axis at 28 of the battery cell array. Three thermally and geometrically equivalent zones 30 are thus defined in the array. In FIG. 2B, three different thermally equivalent zones 30 are shown, similarly defined by three planes 26 intersecting at the central axis of the array. It will be appreciated that the location of the planes 26 and the shape of the zones 30 in FIGS. 2A and 2B are merely two simple examples of what can be provided, and that zones 30 of different shapes can be provided merely by shifting the positions of the planes 26 in a circumferential direction. Furthermore, the planes 26 need not necessarily be flat but can be curved so that the lines 26, as seen in the drawings, are curved rather than straight, provided that three identical zones 30 are defined, each extending outwardly from the central axis 28 to the periphery of the battery outline.

In the cases of FIGS. 2C to 2H, the same reference numerals are used to designate the same features as in FIGS. 2A and 2B. Once again, in each case, two simple arrangements of the planes 26 is shown for each shape of polyhedron, dividing the plan view outline of the battery array in question up into a plurality of zones equal to the number of sides of the polyhedron in question. Each zone is substantially thermally and geometrically equivalent to any other zone, and each zone extends from the central axis 28 outwardly towards the periphery of the polyhedron.

Each arrangement makes provision for the battery as a whole to comprise a plurality of groups of cells connected in series, with the groups themselves connected in parallel, the number of series-connected groups or chains of cells being equal to the number of sides of the polyhedron in question.

Figure 2C:
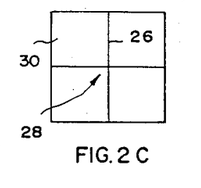
Figure 2D:
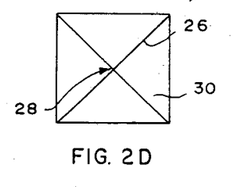
Figure 2E:
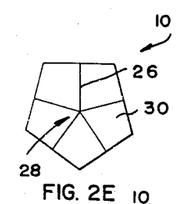
Figure 2F:
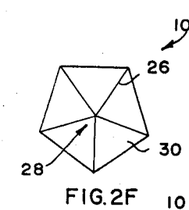
Figure 2G:
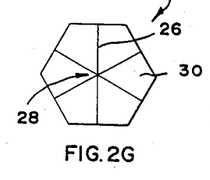
Figure 2H:
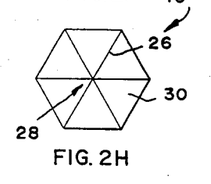
Figure 3:
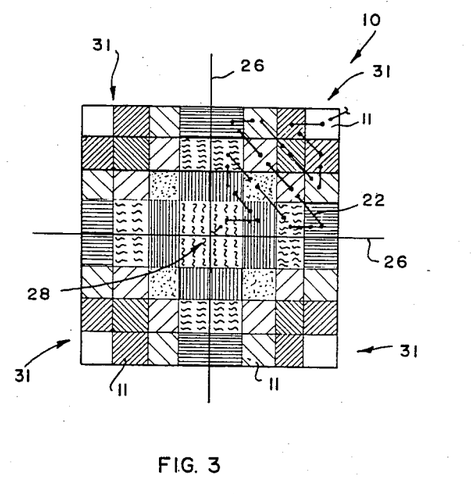
FIG. 3 shows the end elevation of a battery cell array comprising a number of cells packed in a cubic close-pack arrangement.

Turning to FIG. 3, the situation of FIG. 2C is shown in more detail, with the battery as a whole being designated 10 and being made up of an array of cells 11. The cells 11 are shown square in plan view outline, in cubic close-packed arrangement, the planes 26 dividing the battery outline into four identical groups 31 of cells 11. It will be appreciated that, for any particular cell 11 in a group 31, there is a cell 11 in each of the other groups 31 at a geometrically, and consequently thermally, equivalent position (eg as shown by the cells shaded in the same fashion). The battery 10 thus has four groups 31 of cells 11, the cells 11 of each group 31 being connected in series, and the groups 12 themselves being connected in parallel. The cells 11 of each group should be connected together so that the groups 31 have substantially the same internal resistance, for the temperature profile existing over the battery 10 as a whole. The exact order of connection is again not critical, provided that the groups 31 have the same internal resistance, but for practical considerations this requirement is most easily met if each group has its cells connected in exactly the same order and sequence as the cells of the other groups, eg starting at the centre near axis 28 and zig-zagging outwardly, as shown by the lead 22 of one of the groups 31.

Once again as with FIG. 1, the array of cells shown in FIG. 3 is essentially two dimensional, comprising a single flat layer of cells, and it is contemplated that the arrays of FIG. 2 will be similar in this regard.

It will further be appreciated that each group 31 need not have all its cells 11 connected together in a single series or sequence, but can have its cells connected in a desired parallel/series arrangement. However, in this case, in accordance with the invention, each group 31 is regarded as a sub-battery, and is then merely treated according to the same considerations of the present invention, as the battery cell 10 as a whole.

Figures 4A, 4B, 4C, 4D, 5D:
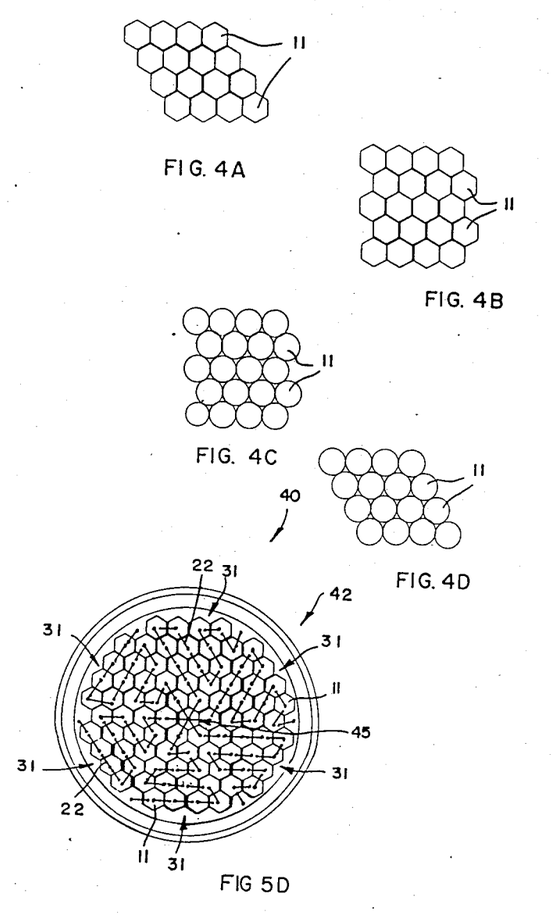
FIGS. 4A to 4D show various arrangements of cells packed in a hexagonal close-packed arrangement.
FIGS. 5A to 5D show various possibilities for cell arrays comprising cells packed in a hexagonal close-packed arrangement.

With reference to FIG. 4, it will be appreciated that cells with circular or regular-hexagonal end elevations can be packed most efficiently into a hexagonal close-packed array, as shown. This provides for the highest possible packing density for the cells in question, leading to a battery which is easily insulated, has a favourable temperature profile, and has a favourable thermal characteristics as a whole. Furthermore, a battery with this type of cell array has an at least approximately honeycomb structure for physical strength.

In FIG. 4A, sixteen hexagonal cells are shown in a lozenge-shaped hexagonal close-packed arrangement, FIG. 4B showing a possibility for twenty such cells in a roughly square arrangement. FIGS. 4C and 4D show the same packing arrangements for circular instead of hexagonal cells, the cells in each case being designated 11.

Figure 5A:
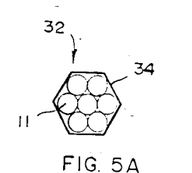
Figure 5B:
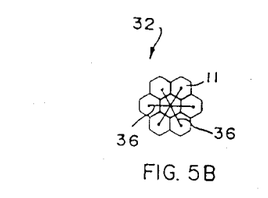

In FIG. 5A, seven cells, which may be circular or hexagonal (circular cells being shown) are packed together in a unit or sub-grouping 32 of seven cells held together by an electrically insulating housing 34. In FIG. 5B the equivalent arrangement for hexagonal cells is shown, with the housing 34 omitted, but with electrical connections 36 being shown, whereby the cells 11 of the group 32 are connected together in parallel.

Figure 5C:
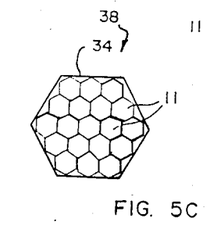

In FIG. 5C, a group 38 of nineteen cells is shown connected together, the cells being hexagonal and being shown held together in a group by a housing 34, which may for example be of mica.

In FIG. 5D, reference numeral 40 shows a battery in accordance with the invention, provided with a peripheral circular thermally insulating housing 42, and having an internal cell arrangement showing a sixfold or hexagonal symmetry. Six groups 31 of cells 11 are shown enclosed by the housing 42. Two possible zig-zag connections of leads 22 for the cell 11 of the groups 31, are shown. It will be appreciated that any suitable such order of connection can be used, provided that each of the groups 31 of cells 11 has the same overall internal resistance, but for practical purposes it will conveniently use the same sequence in each group of cells. The groups 31 will be connected in parallel to form the battery 40. It should further be appreciated that the cells 11 shown in FIG. 5D can in principle be either hexagonal or circular, or in fact can be replaced by hexagonal groups of cells, connected either in series, in parallel, or in series/parallel, for example the seven-cell hexagonal groups shown in FIGS. 5A or 5B, or a nineteen-cell hexagonal group as shown in FIG. 5C.

In FIGS. 5D (as in FIGS. 6A, 7, 8A and 10) a central cell space 45 is left open for electrical connections.

Figure 6A:
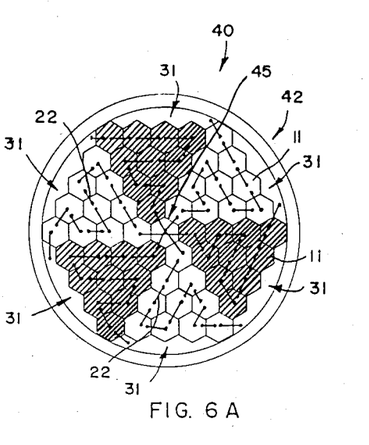
FIGS. 6A and 6B show yet further hexagonal close-packed cell arrays for a battery.
Figure 6B:
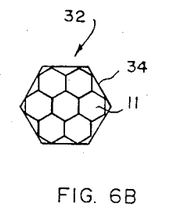

In FIGS. 6A and 6B there are shown arrangements similar to those shown in FIGS. 5A, 5B and 5D, with the same reference numerals referring to the same parts. However, in FIG. 6B, hexagonal cells 11 are shown instead of the circular cells of FIG. 5A, enclosed in a housing 34. Also, whereas in FIG. 5D each of the six groups 31 of cells was shown comprising fourteen cells, an arrangement is shown in FIG. 6A where each of these groups comprises ten cells 11. If each of these cells is replaced by a group of seven cells, as shown in FIG. 6B, the battery 40 of FIG. 6A can comprise 420 cells.

Figure 7:
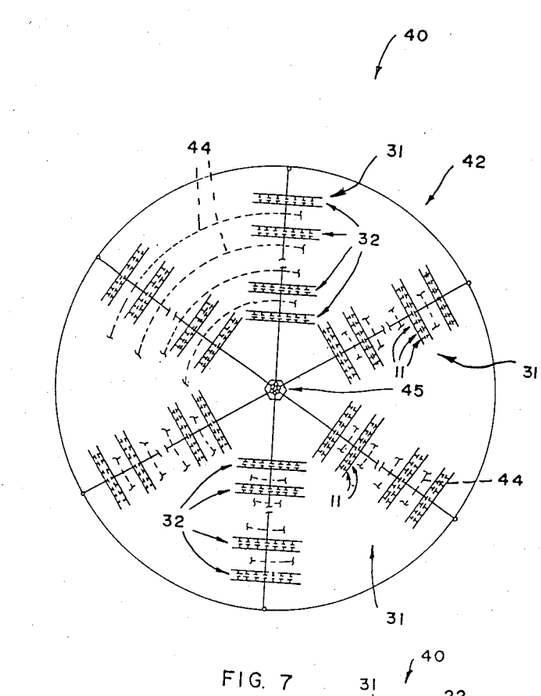
FIG. 7 shows a schematic circuit diagram for a battery in accordance with the invention.

In FIG. 7, a circuit diagram is shown in a battery similar to those of FIGS. 5D and 6A. The battery is shown by numeral 40, and each of the groups is designated 31 and is made up of a plurality of sub-groupings 32 (see FIGS. 5A, 5B and 6B) of seven parallel-connected individual cells 11. The sub-groupings 32 are connected in series, as shown.

To minimize problems connected with overcharging and overdischarging in the event of individual cell failure, conducting ties 44 may be provided interconnecting the various groups 31 with one another at equivalent positions between the various sub-groupings 32. These ties 44 act also to minimize the problem of internal circulating currents in the battery 40, and can also be used where the sub-groupings 32 are replaced by individual cells 11.

Figure 8A:
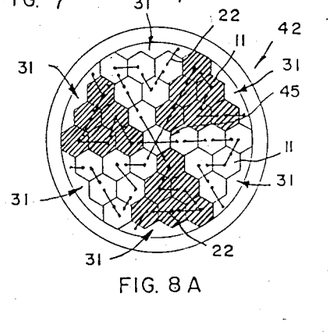
FIGS. 8A and 8B show yet further hexagonal close-packed arrays for cells in a battery in accordance with the invention.

In FIG. 8A, an arrangement is shown substantially similar to FIG. 6A, with the same reference numerals being used for the same parts, except that each group 31 of cells 11 comprises six cells 11, instead of the ten shown in FIG. 6A. This demonstrates the versatility of the invention as regards various packing arrangements meeting the requirements of the present invention. Furthermore, with reference to FIG. 8B, it is shown that, instead of the sub-grouping of seven cells of Figure 6B, a sub-grouping can comprise the group 46 shown whose shape is roughly that of a rhombus or lozenge rather than a hexagon, containing for example the four cells shown in FIG. 8B.

Figure 8B:
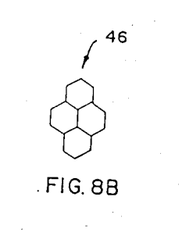
Figure 9:
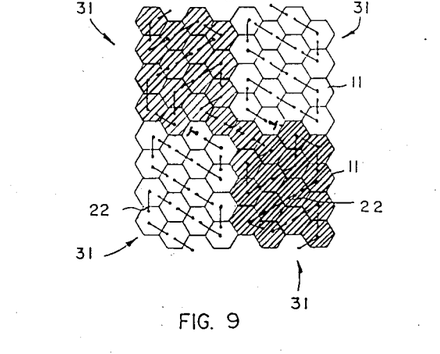
FIG. 9 shows a yet further cell array for cells for a battery in accordance with the invention.

In FIG. 9, the concept of FIG. 8B is shown developed, to produce a rectangular battery arrangement employing hexagonal cells in a hexagonal close-packed arrangement. The battery 48 shown has four groups 31 of cells 11, each group 31 comprising hexagonal cells 11 in close-packed hexagonal arrangement, but each group 31 having its cells packed so that the overall shape of the group 31 is roughly rectangular, and so that the groups 31 fit together so that the overall shape of the battery 48 is roughly rectangular. Two possible ways of connecting the cells 11 of the groups 31 in series by means of the leads 22 are shown.

Figure 10:
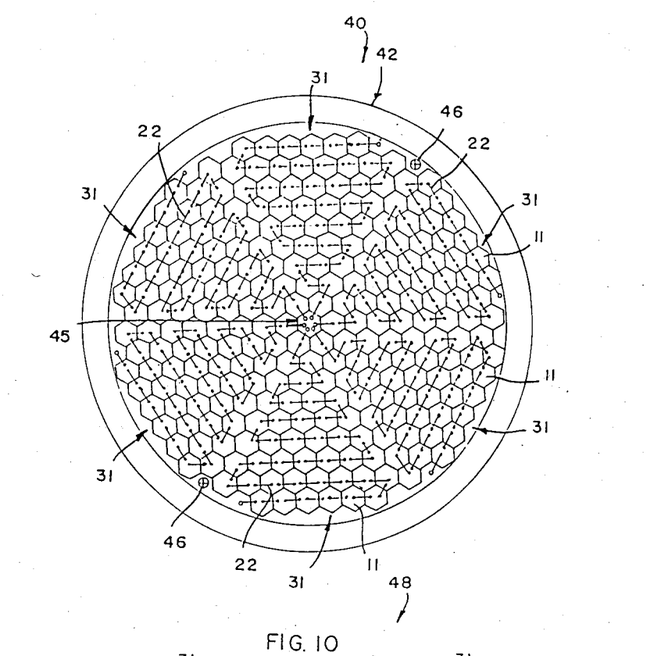
FIG. 10 shows the plan view of a battery cell array comprising hexagonal close-packed cells in accordance with the invention.

FIG. 10 shows yet another cell arrangement similar to FIGS. 5D, 6A and 8A, but with each group 31 containing forty-two cells 11. With cells 11 having an operating voltage of about 2 volts, and with the groups 31 connected in parallel, the voltage of each group 31 and the battery 40 as a whole will be about 84 volts, which is suitable for many electric vehicles which have a working voltage of about 80 volts.

With reference to FIG. 10 it should be noted that the central 45 opening of the battery, corresponding in shape to a hexagonal or circular cell, is convenient to be taken by electrical leads, and that the cell arrangement provides an effective way of packing a large number of cylindrical or hexagonal cells in a cylindrical insulator housing 42 with as little wasted space as possible. Nevertheless, this small amount of unoccupied space can be used effectively for items such as electrical heating controls, thermocouples, eg as shown at 46, thermal management devices, electrical connections, safety features such as fibrous mats, or the like.

It should further be noted that the arrangement of the cells acts so as to minimize temperature gradients in a battery, as the same current passes through the hotter cells in the centre of the battery, as passes through the colder cells near the periphery of the battery which have a higher internal resistance. More heat is thus generated per cell at or near the battery periphery, where the cells have the higher internal resistance, and flattens the temperature gradient of the battery. The battery geometry also acts to minimize the total surface area of the battery, so as to minimize heat loss.

Figure 11:
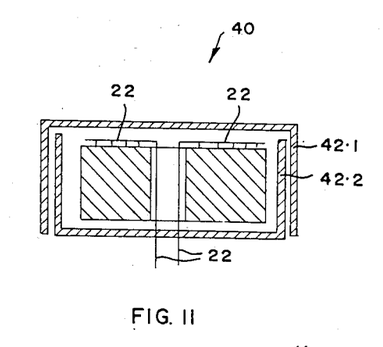
FIG. 11 shows a schematic axial sectional side elevation of a battery in accordance with the invention.

In FIG. 11, a sectional side elevation is taken of the battery of FIG. 10, showing a convenient box-like arrangement for the insulation 42 of FIG. 10. The central opening 45 is shown (on an enlarged scale to simplify illustration) with electrical leads 22 passing therethrough. The insulation 42 is shown split into an upper section 42.1, fitting over a lower section 42.2, for convenience in use, to provide access to battery interior.

Figure 12A:
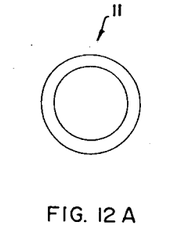
FIGS. 12A and 12B show end elevations of cells for use in a battery in accordance with the invention.
Figure 12B:
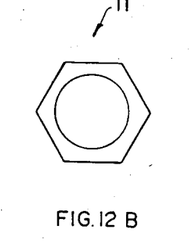

In FIGS. 12A and 12B, there is shown a cell 11 in FIG. 12A of circular cross-section, and in FIG. 12B there is shown a cell 11 of hexagonal cross-section. In practice, cells comprising solid electrolytes are often used, typically solid electrolytes of beta alumina or Nasicon. Often a circular cross-section, as in FIG. 12A, is preferred, as beta alumina and Nasicon can easily be fabricated in tubular form. However, for such cells having cathodes outside the solid electrolyte, it is perfectly feasible to construct an effective hexagonal external shape according to FIG. 12B, with little or no adverse change in performance.

EXAMPLE

Features of the present invention are now described with reference to the following example, which describes, with reference to FIGS. 13 and 14, a comparative test conducted between a battery in accordance with the present invention, and a conventionally connected but otherwise similar battery, used as a control.

Figure 13A:
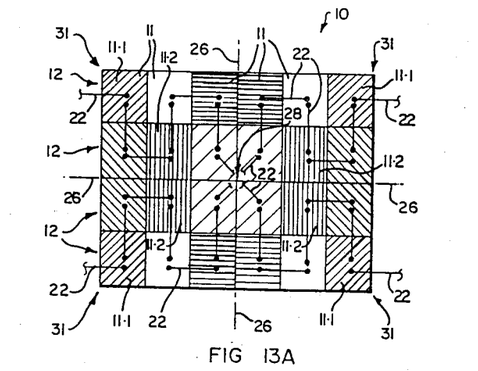
FIG. 13A shows a view similar to FIG. 3 of a battery comprising a relatively small array of cells in accordance with the invention, used in a comparative test.
Figure 13B:
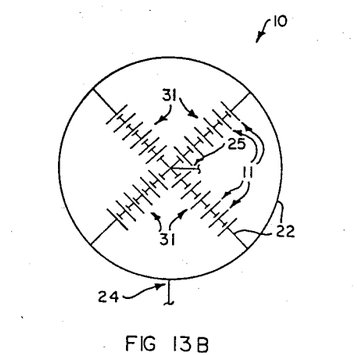
FIG. 13B shows a circuit diagram of the battery of FIG. 13A.
Figure 13C:
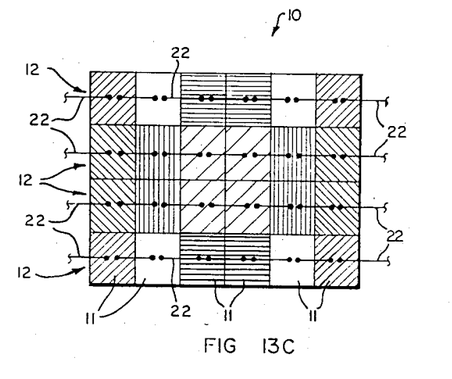
FIG. 13C shows the array of FIG. 13A but with the cells connected in conventional fashion into a battery for use as a control of for comparison with the battery of FIG. 13A.
Figure 13D:
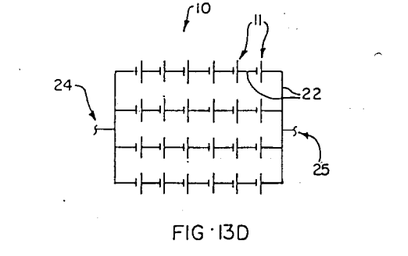
FIG. 13D shows a circuit diagram of the battery of FIG. 13C.

The battery in accordance with the invention is shown in FIGS. 13A and 13B, and the control is shown in FIGS. 13C and 13D. The arrays of cells shown in FIGS. 13A to 13D are similar to the arrays of FIGS. 1 and 3, and unless otherwise specified, the same reference numerals are used to designate the same parts in FIG. 13, as in FIGS. 1 and 3.

Thus, in FIG. 13, the batteries are designated 10 and are each made up of an array comprising a multiplicity of identical cells 11 of square outline in a cubic close-packed arrangement, the battery having a rectangular outline. The battery as a whole is provided with insulation (not shown but see eg 14 in FIG. 1). The arrays of the batteries are two dimensional and comprise flat layers of cells 11, one cell thick.

In FIG. 13A two planes 26 intersecting at 28 are shown dividing the battery outline into four groups 31 of six cells 11. The groups 31 are identical in geometry to each other, each making up a quarter of the cells and located between the two intersecting planes 26. As in FIG. 3 there is, for any particular cell 11 in a group 31, an equivalent cell 11 in each of the other groups in a geometrically and thermally equivalent position. Thus the cells 11.1 are equivalents to one another, and the cells 11.2 are equivalents to one another (as also shown by shading).

The four groups 31 of cells 11 in FIG. 13A are connected in parallel, and the cells 11 of each group are connected in series (see also FIG. 13B). The cells in each group are connected in geometrically (and thermally) the same order as in each of the other groups, so that each cell in a group is in the same position in the series in which it forms part, as the geometrically and thermally equivalent cells in the other groups. The sequence of the series is shown in FIG. 13A as a zig-zag from the innermost corner cell of the group, to the outermost corner cell of the group, roughly radially outwardly relative to the battery outline as a whole.

The battery terminals are designated 24 and 25 respectively and the leads interconnecting the cells are designated 22.

In FIGS. 13C and 13D, the cells are identical to FIGS. 13A and 13B, and the outline and geometrical arrangement of the array to form the battery are identical, as is the insulation. The difference is that the cells are interconnected differently, as shown, into four straight rows of cells connected in series, the rows in turn being connected in parallel. There are thus two equivalent outer rows and two inner rows, geometrically and thermally different from the outer rows, but equivalent to each other. The inner rows, enclosed as they are by the outer rows, in use contain cells which are on average at a higher temperature than the cells of the outer rows.

An experiment was conducted using cells 11 which were sodium/sulphur high temperature cells having a nominal operating temperature of 350° C. Batteries as shown in FIGS. 13A and 13C were assembled from the cells, heated to 350° C. and soaked at this temperature for 2–4 hours to reach thermal equilibrium. They were then each discharged at approximately 40 amps through a fixed resistance. The currents flowing through each of the groups 31 of FIG. 13A and each of the rows of cells of FIG. 13C were measured at 10 minute intervals, and are shown plotted against time in FIGS. 14A and 14B respectively for the batteries of FIGS. 13A and 13C.

Figure 14A:
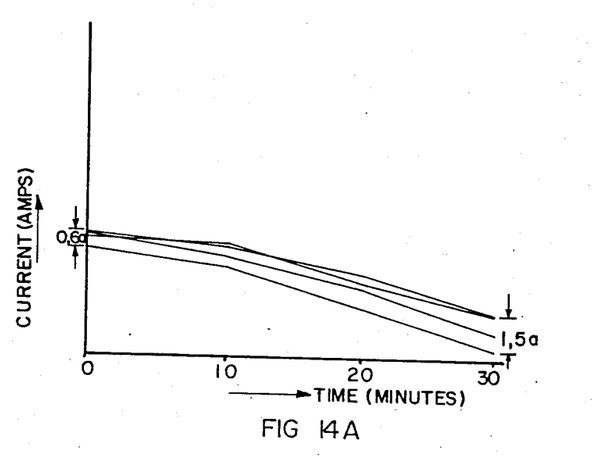
FIG. 14A shows a plot of current against time for the discharge of the battery of FIG. 13A.
Figure 14B:
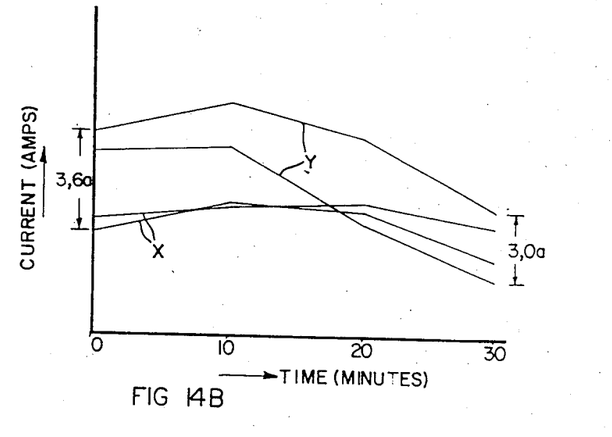
FIG. 14B shows a similar plot for the discharge of the battery of FIG. 13C.

With regard to the plots of FIGS. 14A and 14B it should be noted that the absolute values of the currents (which were approximately 10 amps) are not shown, but the differences between the currents of the various groups and rows are shown. It should also be noted that in FIG. 14B the plots for the two outer rows are designated X and the plots for the two inner rows are designated Y.

From FIGS. 14A and 14B it is immediately apparent that the spread of currents in FIG. 14A is substantially less than that of FIG. 14B, varying from 0.6 amps at the start of the test to 1.5 amp at the end, compared with 3.6 amps at the start for FIG. 14B and 3.0 amps at the end. No material distinction is apparent between the plots for the various groups 31 in FIG. 14A, which all behaved similarly; but in FIG. 14B the two outer rows X are seen to behave similarly and differently from the two inner rows Y, which in turn behaved similarly to each other, the rows Y, being hotter, initially having higher currents (lower internal resistances) than the rows X which had lower temperatures and higher internal resistances.

When certain parallel connected groups of cells in a battery have lower internal resistances and discharge substantially more rapidly than others, as in the case of the inner rows of cells in FIG. 13C, they can be fully discharged at a stage when groups which are discharging more slowly have substantial unused capacity, thereby diminishing the overall useful capacity of the battery as a whole, and leading to the need for premature recharging. Furthermore if discharging (or charging) is interrupted for any reason, the various groups of cells will be in different overall states of charge. This leads to undesirable current loops and internal circulating currents in the battery as the more highly charged groups act to charge up the groups having a lower state of charge until equilibrium is reached. These internal currents lead to loss of energy as wasted heat and to wasted capacity with inefficient use of the battery.

On the other hand, when all the groups have substantially the same internal resistance and discharge at substantially the same rate, the above problems can be at least reduced, and can potentially be avoided entirely.

Furthermore, it should be noted that FIGS. 13A and 13B demonstrate the invention for a comparatively small multiplicity of twenty-four cells divided into four groups each containing only six cells. It will be appreciated that for large arrays, eg containing thousands of cells with groups comprising tens or hundreds of cells in series, discrepancies between individual cells and groups of cells will tend to even out and an even closer spread is anticipated than that shown in FIG. 14A; whereas, without the present invention and with the cells connected in arbitrary groups, some hotter than others, no improvement over what is shown in FIG. 14B is expected for very large arrays.

The invention provides for arrangements of cells in batteries where internal current loops are minimized, where all cells can be discharged at the same rate, and where the overcharge or overdischarge of individual cells can be minimized. The invention is of particular relevance for high temperature batteries where internal cell resistance is significantly affected by cell temperature, eg sodium sulphur cells containing beta alumina or Nasicon solid electrolytes. Provision is made for extremely high practical packing densities, leading to low external surface areas which reduce heat loss and thermal gradients within the battery. Low price and cost are promoted, with high volumetric energy density and a simple construction.

Finally, it should be borne in mind that, although it does not in principle matter which of the individual cells of the group are connected in which particular sequence, it is for convenience better to connect immediate neighbour cells together to keep the voltage difference between those cells low to avoid sparking or shorting. Clearly, all the cells will be electrically insulated from one another, but a danger of sparking will remain, which should be borne in mind.

It is an advantage of the invention that it provides a plurality of potential battery designs, employing various possibilities of series and/or parallel connections, wherein efficient battery operation is promoted, together with efficient battery design.

Although prominence in the aforegoing description has been given to batteries comprising flat, two dimensional arrays of cells, it is to be emphasized that the invention and its advantages apply equally to batteries having three dimensional arrays of cells. The invention this contemplates batteries in which the cells are arranged in three dimensional arrays which can be divided by geometrical planes into various groups of cells which are located and interconnected in accordance with the invention to have the same internal resistance. An example of this is a cubic array of cells which can be divided by three flat intersecting planes which are normal to each other into eight corner portions each comprising groups of cells which are thermally and geometrically equivalent.

I claim:

1. A power storage battery which comprises a multiplicity of interconnected nominally identical high temperature electrochemical power storage cells whose internal resistances vary with their temperatures, the cells being interconnected into a plurality of groups with each group comprising a plurality of the cells at least some of which cells are connected in series and the groups being connected in parallel, the cells being arranged in the battery in a close packed array in positions relative to one another so that the battery in use constantly has a temperature profile dictated by said positions whereby at least some of its cells are constantly at different temperatures from others, the cells of each group being located and interconnected so that, in use, each group comprises at least some cells which are constantly at different temperatures from others but so that each group has substantially the same internal resistance as each other group due to the temperature profiles of the groups from heat generated in the battery during use.

2. A power storage battery comprising a multiplicity of nominally identical high temperature electrochemical power storage cells whose internal resistances vary with their temperatures during operation, the cells being arranged in an array and being divided into a plurality of groups which are connected in parallel, each group comprising a plurality of connected cells at least some of which cells are connected in series, the division of the cells into the groups providing cells in the groups which are at different temperatures during use because of their positions in the array, and the division of the cells into the groups being such that heat generated by the cells in the battery during normal use will inherently maintain a temperature profile in each group which will provide substantially the same internal resistance in each group during use.

3. A battery according to claim 2, in which the cells are arranged in the array such that the heat generated during use will maintain cells near the center of the array at generally higher temperatures than cells near the periphery of the array.

4. A battery according to claim 3, in which each group comprises cells positioned near the center of the array as well as cells positioned near the periphery of the array.

5. A battery according to claim 3, in which the cells are arranged in a substantially two dimensional array, with the outline of the array being substantially a regular polyhedron, and in which the array is divided into a plurality of segments by planes radiating from the center of the array, with the cells in each segment comprising one of the groups.

6. A battery according to claim 5, in which the cells of the two dimensional array comprise a layer of cells not more than two cells thick.

7. A battery according to claim 5, in which each group has the cells connected so that cells in thermally equivalent positions are connected in series in the groups of which they form part.

8. A battery according to claim 5, in which the segments are identical segments.

9. A power storage battery comprising a multiplicity of high temperature electrochemical power storage cells whose internal resistances during use vary with their temperatures, the cells being arranged in any array and being divided into a plurality of groups which are connected in parallel, each group comprising a plurality of connected cells in which at least some of the cells in the group are connected in series, a plurality of the cells of the battery being at different temperatures during use because of of heat of operation of the cells and its effects on the cells due to their positions in the array, and the cells being divided into the groups for heat of operation of the cells in the battery during use to provide thermal equivalence in the groups such that the groups have substantially the same internal resistances during normal use.

10. A battery according to claim 2, in which the cells of the battery are substantially equally spaced relatively to each other.

11. A battery according to claim 10, in which the cells of the battery are in contact with each other.

12. A battery according to claim 11, in which the cells of the battery are arranged in a close packed array.

13. A battery according to claim 12, in which the cells are arranged in a geometrically regular close packed array.

14. A battery according to claim 10, which is in a form suitable for electric vehicle propulsion and which is positioned in an insulated housing.

15. A power storage battery comprising a multiplicity of nominally identical high temperature electrochemical power storage cells whose internal resistances vary with their temperatures during operation, the cells being arranged in an array and being divided into a plurality of groups which are connected in parallel, each group comprising a plurality of connected cells at least some of which cells are connected in series, the cells of the battery being substantially equally spaced relative to one another, the cells of each group comprising cells of differing temperatures during use because of their positions in the array, and the cells for each group being selected to inherently provide substantially the same internal resistance in each group.

16. A battery as claimed in claim 2, in which the cells are sodium sulphur cells, cells employing beta alumina solid electrolyte, cells employing nasicon solid electrolyte, or cells employing molten salt liquid electrolytes.

17. A method of arranging a multiplicity of nominally identical high temperature electrochemical power storage cells, whose internal resistances vary with their temperatures during use, in a close packed array in a power storage battery to provide groups of cells which are connected in parallel, and which groups of cells have substantially the same internal resistances during use despite cells having differing temperatures during use because of the heat of operation and the positioning of the cells in the array, which method comprises selecting the cells for each group such that the heat of operation of the cells during use will produce a thermal profile in each group which will provide substantially the same internal resistance in each group, and connecting the cells in each group to one another with at least some of the cells in each group being connected in series.

18. A method according to claim 17, which comprises arranging the cells of the battery in a close packed array where the cells of adjacent groups are in contact with each other.

19. A method according to claim 17, which comprises selecting the cells of the groups such that each group is thermally equivalent to each other group during use due to the heat of operation of the cells of the battery during use to provide substantially the same internal resistance in each group.

* * * * *

UNITED STATES PATENT AND TRADEMARK OFFICE
CERTIFICATE OF CORRECTION

PATENT NO. : 4,707,420

DATED : November 17, 1987

INVENTOR(S) : Roger J. Wedlake

It is certified that error appears in the above-identified patent and that said Letters Patent is hereby corrected as shown below:

Column 12, line 51, delete the number "3" and insert --2--.

Column 13, line 8, delete the word "of" after the word "because".

Signed and Sealed this

Twenty-first Day of June, 1988

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,707,420

DATED : November 17, 1987

INVENTOR(S) : Roger J. Wedlake

It is certified that error appears in the above-identified patent and that said Letters Patent is hereby corrected as shown below:

On the face of the Patent at the assignee entry [73], change the assignee from "South African Inventions Development Corporation, Pretoria, South Africa" to --Lilliwyte Societe Anonyme, Luxembourg --.

Signed and Sealed this

Sixteenth Day of August, 1988

Attest:

DONALD J. QUIGG

*Attesting Officer*     *Commissioner of Patents and Trademarks*